Patented July 26, 1932

1,869,286

UNITED STATES PATENT OFFICE

WILLIAM WYNDHAM TATUM, OF MANCHESTER, ENGLAND, AND WILLIAM MILLAN TODD, OF FALKIRK, LEONARD JOSEPH HOOLEY, OF GRANGEMOUTH, AND JOHN THOMAS, OF POLMONT, SCOTLAND, ASSIGNORS TO IMPERIAL CHEMICAL INDUSTRIES LIMITED, A CORPORATION OF GREAT BRITAIN

DYES AND DYEING

No Drawing. Application filed March 23, 1931, Serial No. 524,762, and in Great Britain March 28, 1930.

This invention relates to the manufacture of valuable new dyestuffs and to their use in the production of green to blue-green shades on material consisting of or containing cellulose ethers or esters.

The new dyestuffs according to our invention appear to be dihydroxydimercaptoanthraquinones, having the probable formula

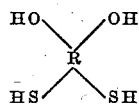

wherein R represents an anthraquinone nucleus and in which the hydroxy and mercapto groups are in alpha positions. We include in the term dihydroxydimercaptoanthraquinone not only the soluble mercapto compounds, but also the closely related disulphides which might be produced by the removal of two hydrogen atoms from two mercapto groups, either in the same molecule or in different molecules, or by the removal of more than one pair of hydrogen atoms from more than one pair of mercapto groups. It will be understood that it is difficult or impossible to assign definitely one or other of these constitutions to our compounds. A process designed to give compounds having one of these constitutions is apt to give compounds having any of them. For this reason we wish it to be understood that in the remainder of this specification and in the claims appended thereto we intend to include in the term "dihydroxydimercaptoanthraquinones" both the true mercaptans having the above formula and also the various related disulphides such as are above mentioned.

Whatever may be the exact constitution of our new dyestuffs they are produced, according to our invention, by the replacement of α-negative groups (i. e. nitro- or halogen) by mercapto-groups, in dihydroxydinitro- or dihydroxydihalogeno-anthraquinones or substituted derivatives of these, by the action of an alkali metal sulphide, especially a sodium polysulphide. If the starting material contains sulphonic groups these are removed, wholly or in part, by treatment with sodium hydrosulphite or other suitable reducing agent.

As starting materials there may be used
1:5-dihydroxy-4:8-dichloroanthraquinone,
1:5-dihydroxy-4:8-dibromoanthraquinone,
1:8-dihydroxy-4:5-dichloroanthraquinone,
1:5-dihydroxy-2:4:6:8-tetrachloroanthraquinone (in which the 2:6-halogen atoms appear to remain unattacked), 1:5-dihydroxy-4:8-dinitroanthraquinone-2:7-disulphonic acid. As already explained, when the last-mentioned substance is used the treatment with sulphide must be followed by a removal of sulphonic groups by means of sodium hydrosulphite or other suitable reducing agent.

It will be observed that all these starting-materials are characterized by possessing two hydroxy-groups and two replaceable negative groups (i. e. nitro or halogen), all in alpha positions. Other groups, such as halogen or methyl, may also be present in β-positions; sulphonic groups may be present but must later be removed wholly or in part.

The products of our invention are dyes for cellulose ether or ester materials, e. g. cellulose acetate silk, and may be applied to such materials by dyeing from aqueous suspensions, especially in the presence of dispersing agents and the like, or by printing, stencilling, or other methods of colouring.

Our invention is illustrated but not limited by the following examples, in which the parts are by weight.

Example 1

The dyestuff, solway emerald, is prepared by the action of sodium sulphide upon 1:5-dihydroxy-4:8-dinitroanthraquinone-2:6-disulphonic acid according to the method described in German Specification No. 172575, whereby a disulphonic acid to dihydroxydimercaptoanthraquinone is obtained. 5 parts of the dyestuff are washed with water to remove salt and the residue is dissolved in 200 parts of boiling water together with 5 parts of sodium hydrosulphite. To the purple solution there are added 6 parts of caustic soda solution (containing 34 parts of sodium hydroxide in 100 parts of solution), and the green precipitate produced is filtered off. The product still contains a sulphonic acid group, but may be used for dyeing acetate silk or wool.

Example 2

The product obtained according to Example 1 is added to 200 parts of boiling water with 5 parts of sodium hydrosulphite and 6 parts of the caustic soda solution. The precipitate now obtained appears to be free from sulphonic acid groups, and dyes acetate silk more readily than the product of Example 1.

Example 3

1 part of 1.4-dichlor-5.8-dihydroxy-anthraquinone is suspended in 10 parts water and 10 parts of methylated spirit. It is then boiled under reflux for several hours with 2 parts of sodium sulphide and 1 part sulphur. The mixture is allowed to cool and the dyestuff isolated by salting out or in other ways. It dyes acetate silk in rather bluish shades of green.

Example 4

20 parts of a 10% aqueous paste of the dyestuffs prepared according to Example 2 are stirred into 3,000 parts of water, 20 parts of soluble oil are added and the temperature then raised to 50° C. 100 parts of cellulose acetate previously well wetted-out are entered into the dyebath at 50° C. and while working the temperature raised to 80° during ¼ hour. The temperature is kept at 80° C. during about ½ hour and the acetyl silk then lifted, rinsed, soaped and dried. A green shade, fast to light, is obtained.

As many apparently widely different embodiments of this invention may be made without departing from the spirit and scope thereof, it is to be understood that we do not limit ourselves to the specific embodiments thereof except as defined in the appended claims.

We claim:

1. As new articles of manufacture, cellulose ether and ester materials dyed in green to blue-green shades, fast to light, said materials being dyed with a dihydroxydimercaptoanthraquinone compound, said compound having both the hydroxyl and mercapto groups in alpha positions and containing less than two sulphonic groups in the anthraquinone nucleus.

2. As new articles of manufacture, cellulose ether and ester materials dyed in green to blue-green shades, fast to light, said materials being dyed with a dihydroxydimercaptoanthraquinone compound, in which the oxygen atoms of both the hydroxyl groups and also all the sulphur atoms present are linked directly to alpha-carbon atoms, the said compound being a green powder which dissolves in sulphuric acid to a blue-violet color becoming bluer on addition of boric acid.

3. As new articles of manufacture, cellulose ether and ester materials dyed in green to blue-green shades, fast to light, said materials being dyed with a dihydroxydimercaptoanthraquinone compound having the probable formula

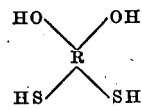

wherein R represents an anthraquinone nucleus and in which the hydroxy and mercapto groups are in the alpha positions.

4. As new articles of manufacture, cellulose ether and ester materials dyed in green to blue-green shades, fast to light, said materials being dyed with a dihydroxydimercaptoanthraquinone compound having the probable formula

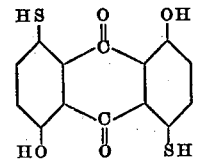

in which the anthraquinone nucleus may be further substituted with halogen or methyl groups in the beta positions.

5. As new articles of manufacture, cellulose ether and ester materials dyed in green to blue-green shades, fast to light, said materials being dyed with a dihydroxydimercaptoanthraquinone compound having the probable formula

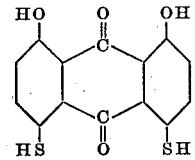

6. In the manufacture of dyed cellulose ether and ester materials having green to blue-green shades, the process which comprises applying to said materials a dihydroxydimercaptoanthraquinone compound, said compound having both the hydroxy and mercapto groups in alpha positions and containing less than two sulphonic groups in the anthraquinone nucleus.

7. In the manufacture of dyed cellulose ether and ester materials having green to blue-green shades, the process which comprises applying to said materials a dihydroxydimercaptoanthraquinone compound, in which the oxygen atoms of both the hydroxyl groups and also all the sulphur atoms present are linked directly to alpha-carbon atoms, the said compound being a green powder which dissolves in sulphuric acid to a blue-violet color becoming bluer on addition of boric acid.

8. In the manufacture of dyed cellulose ether and ester materials having green to blue-green shades, the process which comprises applying to said materials a dihydroxydimercaptoanthraquinone compound having the probable formula
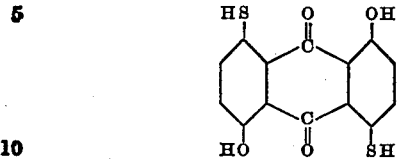
In testimony whereof we affix our signatures.
WILLIAM WYNDHAM TATUM.
WILLIAM MILLAN TODD.
LEONARD JOSEPH HOOLEY.
JOHN THOMAS.